United States Patent Office.

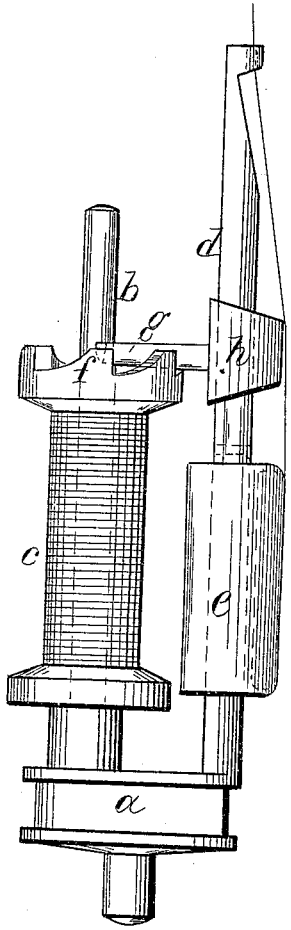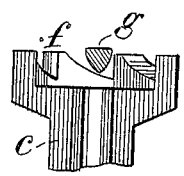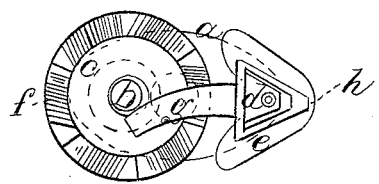

THOMAS GREENHALGH, OF RARITAN, NEW JERSEY, ASSIGNOR TO HIMSELF AND ALEXANDER L. HOLGATE, OF SAME PLACE.

Letters Patent No. 88,956, dated April 13, 1869; antedated April 5, 1869.

IMPROVEMENT IN LET-OFF MECHANISM FOR CARRIERS FOR BRAIDING-MACHINE.

The Schedule referred to in these Letters Patent and making part of the same.

*To all whom it may concern:*

Be it known that I, THOMAS GREENHALGH, of Raritan, in the county of Somerset, and State of New Jersey, have invented and made an Improvement in Let-Off Mechanism for Braiding-Machines; and I do hereby declare the following to be a full, clear, and exact description of the said invention, reference being had to the annexed drawing, making part of this specification, wherein—

Figure 1 is an elevation of the bobbin fitted with my improvement; and

Figure 2 is a plan of the same.

Similar letters denote the same parts.

Bobbin or spool-holders in braiding-machines have heretofore been made with a let-off apparatus, consisting of a weight under which the thread passes to maintain the tension, and by the drawing up of the same, by the braiding of the thread, the let-off pawl has been lifted to liberate the teeth upon the upper end of the spool, and allow that to turn and give off more thread. In the let-off motions of this character the pawl slides upon a vertical bar, usually triangular, and the weight also moves upon the same bar. The pawl projecting from an eye that surrounds said bar, is frequently bound, so that it does not lift freely in consequence of the pawl itself acting as a lever to bind the triangular eye upon the prismatic bar.

The nature of my said invention consists in an arm, extending from the eye around the vertical rod to the side of the spindle upon which the spool is placed, so that the arm will be supported at both ends, and slide without friction, caused by leverage, and hence the let off motion and tension will be much more uniform than heretofore, and there will be less risk of breaking the thread than with the pawl, usually employed, and I make the side of the pawl-arm that comes in contact with the teeth, inclined, in order that it may lift much more easily as the tension of the thread aids in raising the arm.

In the drawing—

*a* is the bobbin-carrier of any ordinary braiding-machine.

*b* is the spindle for the spool *c*, or bobbin.

*d* is the vertical bar upon which the weight *e* slides as operated upon in the usual manner by the thread, shown by the red lines.

The ratchet *f*, at the upper end of the spool *c*, is of the usual character.

*g* is my sliding arm, projecting from the eye *h* that slides freely upon the bar *d*, and at the other end the arm *g* rests against the side of the spindle *b*, and slides thereon when the arm is lifted out of the teeth *f* by the weight raised by the thread. The side of the arm *g* that is in contact with the teeth *f* is inclined, as seen in the sectional view, fig. 3.

The arm *g* cannot bind at either end when under strain, because there is no leverage, hence the let-off will be operated with uniformity, and without risk of breaking the thread, and the arm *g*, being inclined at the side which is in contact with the ratchet-teeth, allows the arm to be lifted freely by the weight and the pull of the thread.

What I claim, and desire to secure by Letters Patent, is—

The arm *g*, with an inclined side and an eye at one end sliding upon the bar *d*, and the other end resting against the side of the spindle *b*, in combination with the weight *e* and spool-ratchet *f*, as and for the purposes specified.

In witness whereof, I have hereunto set my signature, this 1st day of September, A. D. 1868.

THOMAS GREENHALGH.

Witnesses:
CHAS. H. SMITH,
GEO. T. PINCKNEY.